US006444754B1

(12) United States Patent
Chin et al.

(10) Patent No.: US 6,444,754 B1
(45) Date of Patent: Sep. 3, 2002

(54) POLYMER BLENDS WITH IMPROVED IMPACT RESISTANCE

(75) Inventors: Hui Chin, Mt. Kisco, NY (US); James Botkin, Passaic, NJ (US); Francesco Fuso, Therwil (CH); Wiebke Wunderlich, Bickenbach (DE)

(73) Assignee: Ciba Specialty Chemicals Corporation, Tarrytown, NY (US)

( * ) Notice: Subject to any disclaimer, the term of this patent is extended or adjusted under 35 U.S.C. 154(b) by 46 days.

(21) Appl. No.: 09/634,441

(22) Filed: Aug. 8, 2000

Related U.S. Application Data

(60) Provisional application No. 60/148,499, filed on Aug. 12, 1999, now abandoned.

(51) Int. Cl.[7] .......................... C08L 71/12; C08L 67/02; C08L 77/00; C08L 25/06
(52) U.S. Cl. .......................... 525/92 B; 525/64; 525/66; 525/68; 525/92 D; 525/92 F; 525/133; 525/166; 525/179
(58) Field of Search .............................. 525/92 B, 92 F, 525/92 D, 133, 179, 166, 64, 66, 68

(56) References Cited

U.S. PATENT DOCUMENTS

| | | | |
|---|---|---|---|
| 4,315,086 A | 2/1982 | Ueno et al. | 525/391 |
| 4,581,429 A | 4/1986 | Solomon et al. | 526/220 |
| 4,600,741 A | 7/1986 | Aycock et al. | 524/139 |
| 4,659,763 A | 4/1987 | Gallucci et al. | 524/358 |
| 4,732,937 A | 3/1988 | Sybert | 525/92 |
| 4,824,915 A | 4/1989 | Aycock et al. | 525/397 |
| 4,873,286 A | 10/1989 | Gallucci et al. | 525/92 |
| 5,000,897 A | 3/1991 | Chambers | 264/141 |
| 5,041,504 A | 8/1991 | Brown et al. | 525/396 |
| 5,096,979 A | 3/1992 | Brown et al. | 525/396 |
| 5,100,961 A | 3/1992 | Brown et al. | 525/92 |
| 5,141,984 A | 8/1992 | Orikasa et al. | 524/494 |
| 5,231,146 A | 7/1993 | Brown et al. | 525/396 |
| 5,262,478 A | 11/1993 | Nishio et al. | 525/68 |
| 5,627,248 A | 5/1997 | Koster et al. | 526/217 |
| 5,677,388 A | 10/1997 | Koster et al. | 525/314 |
| 5,721,320 A | 2/1998 | Priddy et al. | 525/316 |
| 5,891,971 A | 4/1999 | Keoshkerian et al. | 526/210 |

FOREIGN PATENT DOCUMENTS

| | | |
|---|---|---|
| DE | 3644208 | 7/1987 |
| DE | 3924237 | 1/1990 |
| DE | 3837647 | 5/1990 |
| EP | 0347539 | 12/1989 |
| EP | 0572919 | 12/1993 |
| EP | 0747440 | 12/1996 |
| JP | 2245063 | 9/1990 |
| WO | 97/36944 | 10/1997 |
| WO | 98/13392 | 4/1998 |
| WO | 99/14273 | 3/1999 |
| WO | 99/46261 | 9/1999 |

OTHER PUBLICATIONS

D. Benoit et al., J. Am. Chem. Soc., (1999), 121, pp. 3904–3902.
C. Hawker., J. Am. Chem. Soc., (1994), 116, pp. 11185–11186.
S. Kobatake et al., Macromolecules, (1998), 31, pp. 3735–3739.
H. Kim et al., Polymer Engineering and Science, Apr. 1995, vol. 35, No. 8, pp. 648–657.
K. Dedecker et al., Pure & Appl. Chem., vol. 70, No. 6, pp. 1289–1293, (1998).
C. Chiang et al., Journal of Polymer Science: Part B: Polymer Physics, vol. 36, pp. 1805–1819, 1998.
C. Chiang et al., Journal of Applied Polymer Science, vol. 61, pp. 2411–2421 (1996).
Derwent Abstract 1990–339170 for JP 02245063 (1990).
Derwent Abstract 1990–030980 for DE 3924237 (1990).
Derwent Abstract 1987–186444 for DE 3644208 (1987).
Derwent Abstract 1990–148637 for DE 3837647 (1990).

*Primary Examiner*—Patricia A. Short
(74) *Attorney, Agent, or Firm*—Tyler A. Stevenson

(57) ABSTRACT

Polymer blends, in particular polyphenylene ether-polyamide blends, are effectively compatibilized by incorporating under blending conditions certain oligomers, cooligomers, polymers and copolymers of narrow molecular weight distribution that are prepared under free radical polymerization conditions with glycidyl-functionalized nitroxyl initiators. The oligomers, cooligomers, polymers and copolymers contain at least one oxyamine group and at least one glycidyl-containing initiator group. The polymer blends have excellent mechanical properties.

34 Claims, No Drawings

POLYMER BLENDS WITH IMPROVED IMPACT RESISTANCE

This application claims the benefit under 35 U.S.C. 119(e) of U.S. Provisional Application No. 60/148,499, Filed Aug. 12, 1999 now abandoned.

The present invention relates to polymer blends with improved mechanical properties, in particular polyphenylene ether-polyamide resin blends.

Polyphenylene ethers, also called polyphenylene oxides, and abbreviated as PPE or PPO, are a widely used class of thermoplastic engineering resins characterized by excellent hydrolytic stability, dimensional stability, toughness, heat resistance and dielectric properties. However, they are deficient in certain other properties such as workability and solvent resistance. Therefore, there is a continuing search for means for modifying polyphenylene ethers to improve their deficiencies.

In order to overcome these problems polyphenylene ethers are blended with other resins such as polyesters, polyamides or olefin polymers. Blends of polyphenylene ethers with polyamides such as nylon 6,6 are of particular interest. Such blends are inherently incompatible and therefore "compatibilizing" agents are necessary to achieve the desired properties. Without compatibilizing agents molded articles made from these blends have inferior mechanical properties, such as low impact strength. There has been an extensive amount of work aimed at improving the compatibility of blends of polyphenylene ether and polyamide resins.

Attempts have been made towards grafting polyphenylene ether directly to the polyamide. For example U.S. Pat. No. 4,315,086 describes the use of a polyfunctional compound selected from the group consisting of liquid diene polymers, epoxy compounds and compounds having both unsaturation and a reactive group such as a carboxylic acid, anhydride, ester, etc. for this purpose. The epoxy compounds are well known epoxy resins and the like. U.S. Pat. Nos. 4,873,286 and 5,000,897 disclose the use of aliphatic polycarboxylic acids or derivatives for grafting or partially grafting polyphenylene ether with polyamide. U.S. Pat. No. 4,824,915 teaches the use of a multi-functional compound containing for example, an acid chloride group and an anhydride group for this purpose.

Other workers have focused on the formation of copolymers of polyphenylene ether and polyamide to effect their compatibility. U.S. Pat. No. 4,600,741 discloses the use of polyphenylene ether functionalized with carboxylic acid and derivatives for this purpose. U.S. Pat. No. 4,732,937 teaches the use of epoxy functionalized polyphenylene ether in order to form a copolymer with a polyester or polyamide.

U.S. Pat. Nos. 5,041,504, 5,096,979 and 5,100,961 and EP 347,539 disclose the use of epoxytriazine-capped polyphenylene ether to form copolymers with polyamides for the purposes of forming compatible blends of the two polymers.

U.S. Pat. No. 5,231,146 teaches blends of polyphenylene ether and block polyetheramides with good mechanical properties with the incorporation of a polyepoxide. Preferred polyepoxides are triglycidyl functionalized triazine derivatives. Also mentioned are copolymers of glycidyl acrylate and glycidyl methacrylate with polyacrylates, polyacrylonitrile and polystyrene. DE3837647 teaches compatibilization of polyphenylene ether-polyamide blends with the use of glycidyl triazine derivatives.

U.S. Pat. No. 4,659,763 discloses the use of quinone compounds as compatibilizing agents for blends of polyphenylene ether and polyamide.

Chiang and Chang, in the *Journal of Applied Polymer Science*, 61(13), 1996, 2411–2421, discusses compatibilizing blends of polyphenylene oxide and polyamide-6 with styrene-glycidyl methacrylate copolymers. The same workers, in the *Journal of Polymer Science: Part B: Polymer Physics*, 36(11), 1998, 1805–1819, disclose that a tetrafunctional epoxy monomer, N,N,N'N'-tetraglycidyl-4,4'-diaminodiphenyl methane, is an efficient compatibilizer for polyphenylene ether-polyamide-6 blends.

U.S. Pat. No. 5,141,984 discloses compatibilizing blends of polyamide resins with polyphenylene ether or polycarbonate resins with a mixture of an epoxy group-containing olefin copolymer and a vinyl polymer or copolymer.

Dedecker and Groeninckx, in *Pure Appl. Chem.* 70(6), 1998, 1289–1293, teaches compatibilization of polystyrene or polyphenylene oxide with polyamide-6 with the use of a maleic anhydride-styrene copolymer. The anhydride groups of the copolymer react with the amino end groups of polyamide-6 and the copolymer is miscible with polystyrene or polyphenylene oxide, giving rise to the formation of a graft copolymer at the interface.

Kim and Jo, in *Polymer Engineering and Science*, 35(8), 1995, 648–657, teach that a partially hydrolyzed styrene/t-butyl acrylate diblock copolymer performs as a compatibilizer for polyphenylene ether-polyamide-6 blends. Presumably, the amine end groups of the polyamide react with the carboxyl groups of the partially hydrolyzed diblock copolymer.

DE 3644208 discloses compatibilizing blends of polyphenylene ether-polyamide resins with a polyphenylene ether containing epoxy groups and a styrene resin. JP2245063 teaches polyphenylene ether-polyamide blends which exhibits a good balance of overall properties by incorporating a copolymer obtained from styrene, an epoxy-containing monomer and another monomer. DE3924237 discloses compatibilizing thermoplastic resins containing polar residues with polyphenylene ether by employing styrene resin with epoxy residues and styrene without epoxy groups.

EP 747440 discloses the compatibilization of polyphenylene ether-polyamide blends while maintaining good impact strength with a known compatibilizing compound and in the presence of a known impact modifying agent. Among the compatibilizers are epoxy compounds, and among the impact modifying agents are AB block copolymers such as styrene-butadiene or styrene-isoprene.

Kobatake, et al., in *Macromolecules*, 31(11), 1998, 3735–3739, discloses an epoxy-functionalized nitroxyl compound. The epoxy group is used as a terminator for polybutadiene prepared by anionic polymerization. The nitroxy-functionalized polybutadiene is used as a macroinitiator in the formation of styrene-butadiene block copolymers.

U.S. Pat. No. 4,581,429, to Solomon et al., issued Apr. 8, 1986, discloses a free radical polymerization process which controls the growth of polymer chains to produce short chain or oligomeric homopolymers and copolymers, including block and graft copolymers. The process employs an initiator having the formula (in part) R'R"N—O—X, where X is a free radical species capable of polymerizing unsaturated monomers. Specifically mentioned R'R"N—O. radical groups are derived from tetraethylisoindoline, tetrapropylisoindoline, tetramethylpiperidine, tetramethylpyrrolidine or di-t-butylamine.

U.S. Pat. No. 5,721,320 and WO 97/36944 disclose the preparation of rubber-reinforced polymers by polymerizing a vinyl aromatic monomer in the presence of a diene rubber having at least one stable free radical group, under polymerization conditions such that a vinyl aromatic-diene block and/or graft copolymer rubber is formed. Examples of stable free radical groups given are nitroxyl groups. U.S. Pat. No. 5,891,971 teaches the preparation of polymers with narrow polydispersity using alkoxyamine initiators. U.S. Pat. Nos. 5,627,248 and 5,677,388 disclose the free-radical polymerization of vinyl aromatic monomers using a difunctional nitroxyl initiator. Hawker in *J. Am. Chem. Soc.*, 116, 1994, 11185–11186, discloses the preparation of low polydispersity polystyrene with a hindered alkoxyamine compound.

Benoit, et al., in *J. Am. Chem. Soc.*, 121(16), 1999, 3904–3920, discloses the polymerization of styrene with molecular weight and polydispersity control using a variety of alkoxyamine initiators.

Surprisingly, it has been found that certain oligomers, polymers, cooligomers or copolymers (block or random) of narrow molecular weight distribution, and whose polymerization is initiated with glycidyl-functionalized nitroxyl derivatives, are especially effective at forming copolymers with polyamides under blending conditions; these copolymers in turn are especially effective as compatibilizers for the polyphenylene ether-polyamide blends. The improved compatibility of blends of polyphenylene ethers and polyamides comprising these novel copolymers is exhibited in the form of excellent mechanical properties such as impact strength.

The (co)oligomers and (co)polymers of narrow molecular weight distribution, and whose polymerization is initiated with glycidyl-functionalized nitroxyl derivatives contain at least one glycidyl initiator group and at least one oxyamine group as discussed infra. For the purposes of this invention they may be generally referred to as compatibilizers or compatibilizing agents.

Presumably, the epoxy functional groups of the resultant (co)oligomers and (co)polymers react with the amine and/or the carboxylic acid end groups of the polyamide under blending conditions to form the novel polyamide-copolymer compatibilizers. The (co)oligomer or (co)polymer itself is one that is compatible with polyphenylene ether. In this way highly compatible polyphenylene ether-polyamide mixtures are obtained when blended in the presence of the epoxy-containing (co)oligomers or (co)polymers.

For example, if the oligomer or polymer containing the glycidyl and oxyamine groups is a polystyrene, a composition comprising polyphenylene ether, polyamide, and the glycidyl-functionalized polystyrene, and subjected to normal blending conditions will form a polystyrene-polyamide copolymer. The polystyrene is miscible with the polyphenylene ether, and hence under such conditions a highly compatible blend of polyphenylene ether-polyamide will result. It is not necessary that all of the polyamide form copolymer; that is to say the highly compatible polyphenylene ether-polyamide blends of the instant invention may contain unreacted polyamide. The resultant highly compatible blend exhibits excellent impact strength.

The oligomers, polymers, cooligomers or copolymers containing glycidyl and oxyamine groups of the instant invention, prepared by free-radical polymerization of at least one ethylenically unsaturated monomer or oligomer in the presence of a glycidyl-functionalized nitroxyl initiator are also useful for compatibilizing other known polymer blends. Polyesters, containing terminal carboxylic acid groups, are also known to react with epoxides. Therefore, where appropriate, polyesters may be substituted for polyamides in the blends described above.

Further, the (co)oligomers or (co)polymers containing glycidyl and oxyamine groups of the instant invention are useful towards compatibilizing blends of polystyrene with polyesters as well as blends of polystyrene with polyamides.

An object of this invention therefore, is to provide a novel composition comprising i.) a polymer selected from the group consisting of polyphenylene ether and polystyrene, ii.) at least one other polymer containing amine or carboxylic acid end groups, and iii.) an oligomer, polymer, cooligomer or copolymer prepared by free-radical polymerization of at least one ethylenically unsaturated monomer or oligomer in the presence of a glycidyl-functionalized nitroxyl initiator.

Another object of this invention is to provide a novel method for preparing highly compatible polymer mixtures comprising blending under intimate blending conditions i.) a polymer selected from the group consisting of polyphenylene ether and polystyrene, ii.) at least one other polymer containing amine or carboxylic acid end groups, iii.) an oligomer, polymer, cooligomer or copolymer prepared by free-radical polymerization of at least one ethylenically unsaturated monomer or oligomer in the presence of a glycidyl-functionalized nitroxyl initiator, and iv.) optional further additives.

Preferably, the polymer of component i.) is a polyphenylene ether and the polymer of component ii.) is a polyamide.

The glycidyl-functionalized nitroxyl initiators employed in the preparation of the (co)oligomers or (co)polymers of narrow molecular weight distribution of the instant invention are of the formulae

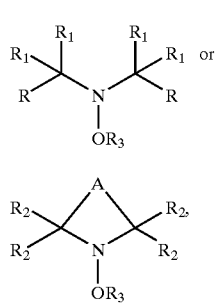

wherein

R are independently hydrogen, halogen, NO$_2$, cyano, —CONR$_5$R$_6$, —(R$_9$)COOR$_4$, —C(O)—R$_7$, —OR$_8$, —SR$_8$, —NHR$_8$, —N(R$_8$)$_2$, carbamoyl, di(C$_1$–C$_{18}$alkyl)carbamoyl, —C(=NR$_5$)(NHR$_6$) or R has the same definition as R$_1$;

R$_1$ are independently unsubstituted C$_1$–C$_{18}$alkyl, C$_2$–C$_{18}$alkenyl, C$_2$–C$_{18}$alkynyl, C$_7$–C$_9$phenylalkyl, C$_3$–C$_{12}$cycloalkyl or C$_2$–C$_{12}$heterocycloalkyl; or C$_1$–C$_{18}$alkyl, C$_2$–C$_{18}$alkenyl, C$_2$–C$_{18}$ alkynyl, C$_7$–C$_9$phenylalkyl, C$_3$–C$_{12}$cycloalkyl or C$_2$–C$_{12}$heterocycloalkyl, which are substituted by NO$_2$, halogen, amino, hydroxy, cyano, carboxy, C$_1$–C$_4$alkoxy, C$_1$–C$_4$alkylthio, C$_1$–C$_4$alkylamino or di(C$_1$–C$_4$alkyl)amino; or phenyl, naphthyl, which are unsubstituted or substituted by C$_1$–C$_4$alkyl, C$_1$–C$_4$alkoxy, C$_1$–C$_4$alkylthio, halogen, cyano, hydroxy, carboxy, C$_1$–C$_4$alkylamino or di(C$_1$–C$_4$alkyl) amino;

$R_4$ is hydrogen, $C_1$–$C_{18}$alkyl, phenyl, an alkali metal cation or a tetraalkylammonium cation;

$R_5$ and $R_6$ are hydrogen, $C_1$–$C_{18}$alkyl, $C_2$–$C_{18}$alkyl which is substituted by at least one hydroxy group or, taken together, form a $C_2$–$C_{12}$alkylene bridge or a $C_2$–$C_{12}$-alkylene bridge interrupted by at least one O or/and $NR_8$ atom;

$R_7$ is hydrogen, $C_1$–$C_{18}$alkyl or phenyl;

$R_8$ is hydrogen, $C_1$–$C_{18}$alkyl or $C_2$–$C_{18}$alkyl which is substituted by at least one hydroxy group;

$R_9$ is $C_1$–$C_{12}$alkylene or a direct bond; or all $R_1$ form together the residue of a polycyclic cycloaliphatic ring system or a polycyclic heterocycloaliphatic ring system with at least one di- or trivalent nitrogen atom;

$R_2$ are independently of each other phenyl or $C_1$–$C_6$alkyl or two together with the linking carbon atom form a $C_5$–$C_6$cycloalkyl group;

A is a divalent group which forms a carbocyclic or heterocyclic 5-, 6- or 7-membered ring which may be further substituted; and $R_3$ is a radical of formula (II)

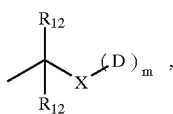

(II)

wherein

X is phenylene, naphthylene or biphenylene, which are unsubstituted or substituted by $NO_2$, halogen, amino, hydroxy, cyano, carboxy, $C_1$–$C_4$alkoxy, $C_1$–$C_4$alkylthio, $C_1$–$C_4$alkylamino or di($C_1$–$C_4$alkyl)amino;

$R_{12}$ are independently of each other H or $CH_3$;

D is a group

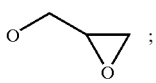

;

and m is a number from 1 to 4.

Halogen is fluoro, chloro, bromo or iodo.

The alkyl radicals in the various substituents may be linear or branched. Examples of alkyl containing 1 to 18 carbon atoms are methyl, ethyl, propyl, isopropyl, butyl, 2-butyl, isobutyl, t-butyl, pentyl, 2-pentyl, hexyl, heptyl, octyl, 2-ethylhexyl, t-octyl, nonyl, decyl, undecyl, dodecyl, tridecyl, tetradecyl, hexadecyl and octadecyl.

The alkenyl radicals in the various substituents may be linear or branched. Examples of $C_2$–$C_{18}$alkenyl are vinyl, allyl, 2-methylallyl, butenyl, hexenyl, undecenyl and octadecenyl. Preferred alkenyls are those, wherein the carbon atom in the 1-position is saturated and where the double bond is not activated by substituents like O, C=O, and the like.

Examples of $C_2$–$C_{18}$alkynyl are ethynyl, 2-butynyl, 3-hexynyl, 5-undecynyl, 6-octadecynyl. The alkynyl radicals may be linear or branched.

$C_7$–$C_9$phenylalkyl is for example benzyl, phenylpropyl, α,α-dimethylbenzyl or α-methylbenzyl.

$C_3$–$C_{12}$cycloalkyl which is unsubstituted or substituted by 1, 2 or 3 $C_1$–$C_4$alkyl is typically cyclopropyl, cyclopentyl, methylcyclopentyl, dimethylcyclopentyl, cyclohexyl, methylcyclohexyl.

Alkyl substituted by-OH is typically 2-hydroxyethyl, 2-hydroxypropyl or 2-hydroxybutyl. $C_1$–$C_{18}$Alkyl substituted by $C_1$–$C_8$alkoxy, preferably by $C_1$–$C_4$alkoxy, in particular by methoxy or ethoxy, is typically 2-methoxyethyl, 2-ethoxyethyl, 3-methoxypropyl, 3-ethoxypropyl, 3-butoxypropyl, 3-octoxypropyl and 4-methoxybutyl.

$C_1$–$C_{18}$Alkyl substituted by di($C_1$–$C_4$alkyl)amino is preferably e.g. dimethylamino, diethylamino, 2-dimethylaminoethyl, 2-diethylaminoethyl, 3-dimethylaminopropyl, 3-diethylaminopropyl, 3-dibutylaminopropyl and 4-diethylaminobutyl.

$C_1$–$C_{18}$Alkyl substituted by $C_1$–$C_4$alkylamino is preferably e.g. methylamino, ethylamino, 2-methylaminoethyl, 2-ethylaminoethyl, 3-methylaminopropyl, 3-ethylaminopropyl, 3-butylaminopropyl and 4-ethylaminobutyl.

$C_1$–$C_8$Alkoxy and, preferably $C_1$–$C_4$alkoxy, are typically methoxy, ethoxy, propoxy, isopropoxy, butoxy, isobutoxy, pentoxy, isopentoxy, hexoxy, heptoxy or octoxy.

$C_1$–$C_4$Alkylthio is typically thiomethyl, thioethyl, thiopropyl, thioisopropyl, thiobutyl and thioisobutyl.

$C_2$–$C_{12}$heterocycloalkyl is typically oxirane, 1,4-dioxane, tetrahydrofuran, γ-butyrolactone, ε-caprolactam, oxirane, aziridine, diaziridine, pyrrole, pyrrolidine, thiophen, furan, pyrazole, imidazole, oxazole, oxazolidine, thiazole, pyran, thiopyran, piperidine or morpholine.

Examples of $C_2$–$C_{12}$alkylene bridges, preferably of $C_2$–$C_6$alkylene bridges, are ethylene, propylene, butylene, pentylene, hexylene.

$C_2$–$C_{12}$alkylene bridges interrupted by at least one N or O atom are, for example, —$CH_2$—O—$CH_2$—$CH_2$—, —$CH_2$—O—$CH_2$—$CH_2$—$CH_2$—, —$CH_2$—O—$CH_2$—$CH_2$—$CH_2$—$CH_2$—, —$CH_2$—O—$CH_2$—$CH_2$—O—$CH_2$—, —$CH_2$—NH—$CH_2$—$CH_2$—, —$CH_2$—NH—$CH_2$—$CH_2$—$CH_2$—, —$CH_2$—NH—$CH_2$—$CH_2$—$CH_2$—$CH_2$—, —$CH_2$—NH—$CH_2$—$CH_2$—NH—$CH_2$— or —$CH_2$—NH—$CH_2$—$CH_2$—O—$CH_2$—.

Phenyl substituted by 1, 2 or 3 $C_1$–$C_4$alkyl or $C_1$–$C_4$alkoxy is typically methylphenyl, dimethylphenyl, trimethylphenyl, t-butylphenyl, di-t-butylphenyl, 3,5-di-t-butyl-4-methylphenyl, methoxyphenyl, ethoxyphenyl and butoxyphenyl.

Examples of polycyclic cycloaliphatic ring systems are adamantane, cubane, twistane, norbornane, bicyclo[2.2.2]octane or bicyclo[3.2.1]octane.

An example of a polycyclic heterocycloaliphatic ring system is hexamethylentetramine (urotropine).

Examples for a divalent group A required to form a cyclic 5-, 6- or 7-membered ring are: $C_2$–$C_4$alkylene, $C_2$–$C_4$alkenylene or 1,2 phenylene which groups may be unsubstituted or substituted by $NO_2$, halogen, amino, hydroxy, cyano, $C_1$–$C_{18}$alkylcarboxy, $C_1$–$C_{18}$alkoxycarbonyl, $C_1$–$C_{18}$alkylcarbonyl, $C_1$–$C_{18}$alkoxy, benzyloxy, $C_1$–$C_{18}$alkanoyloxy, benzoyloxy, $C_1$–$C_{18}$alkylthio, $C_1$–$C_{18}$alkylamino, di($C_1$–$C_{18}$alkyl)amino or phenyl.

When A has the meaning of $C_2$–$C_4$alkylene or $C_2$–$C_4$alkenylene, these groups may also be interrupted by an O or N atom.

$C_2$–$C_4$alkylene bridges interrupted by at least one N or O atom are, for example, —$CH_2$—O—$CH_2$—$CH_2$—, —$CH_2$—O—$CH_2$—, —O—$CH_2$—$CH_2$—, —O—$CH_2$—O—$CH_2$—, —$CH_2$—NH—$CH_2$—, —$CH_2$—NH—$CH_2$—$CH_2$—, —NH—$CH_2$—$CH_2$—, —NH—$CH_2$—NH—$CH_2$—, —O—$CH_2$— or —$CH_2$—O—C(O)—.

The C-atom to which the substituents $R_1$ are bound is preferably a secondary or tertiary C-atom more preferably it is a tertiary C-atom.

Preferred is a compound of formula (Ia) or (Ib), wherein

R are independently $NO_2$, cyano, $-(R_9)COOR_4$, $-CONR_5R_6$, $-C(O)-R_7$, $-OR$, carbamoyl, $di(C_1-C_{18}alkyl)carbamoyl$, $-C(=NR_5)(NHR_6)$ or R has the same definition as $R_1$;

$R_1$ are independently unsubstituted $C_1-C_8$alkyl or $C_5-C_7$cycloalkyl; or phenyl, which is unsubstituted or substituted by $C_1-C_4$alkyl, $C_1-C_4$alkoxy, cyano, hydroxy, carboxy, $C_1-C_4$alkylamino or $di(C_1-C_4$alkyl)amino;

$R_4$ is $C_1-C_8$alkyl, phenyl, an alkali metal cation or a tetraalkylammonium cation;

$R_5$ and $R_6$ are hydrogen, $C_1-C_8$alkyl, $C_2-C_8$alkyl which is substituted by at least one hydroxy group or, taken together, form a $C_2-C_6$alkylene bridge;

$R_7$ is, $C_1-C_8$alkyl or phenyl;

$R_8$ is $C_1-C_8$alkyl or $C_{21}-C_8$alkyl which is substituted by at least one hydroxy group;

$R_9$ is $C_1-C_4$alkylene or a direct bond;

$R_2$ are independently $C_1-C_6$alkyl;

A is a divalent group which forms a carbocyclic or heterocyclic 5-, 6- or 7-membered ring which may be further substituted; and $R_3$ is a radical of formula (II)

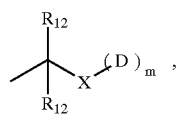

(II)

wherein

X is phenylene, naphthylene or biphenylene, which are unsubstituted or substituted by $NO_2$, halogen, amino or hydroxy;

$R_{12}$ are independently of each other H or $CH_3$;

D is a group

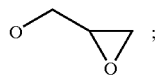

and m is a number from 1 to 4.

More preferred is a compound of formula (Ia) or (Ib), wherein the group

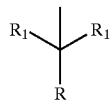

is

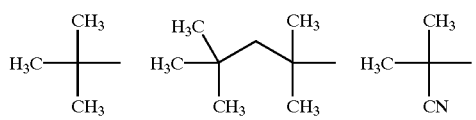

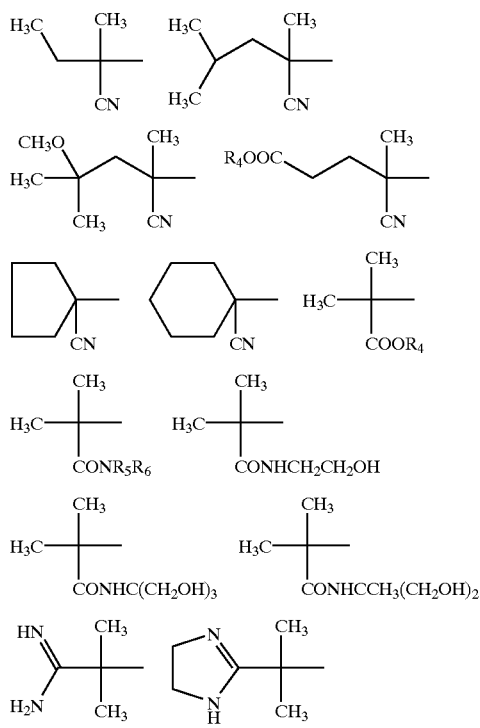

$R_2$ are independently $C_1-C_6$alkyl;

A is a divalent group which forms a carbocyclic or heterocyclic 5-, 6- or 7-membered ring which may be further substituted; and $R_3$ is a radical of formula (II)

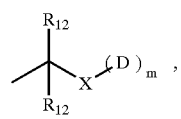

(II)

wherein

X is phenylene, naphthylene or biphenylene;

one $R_{12}$ is H and the other $R_{12}$ is $CH_3$;

D is a group

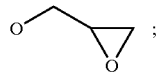

and m is a number from 1 to 2.

Particularly preferred is a compound of formula (Ib), wherein $R_2$ are independently $CH_3$ or $C_2H_5$;

A is a divalent group which forms a carbocyclic or heterocyclic 5- or 6-membered ring which may be further substituted; and $R_3$ is a radical of formula (II)

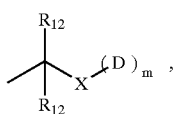
(II)

wherein
X is phenylene, naphthylene or biphenylene;
one $R_{12}$ is H and the other $R_{12}$ is $CH_3$;
D is a group

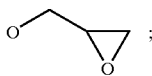

and
m is a number from 1 to 2.
Most preferred is a compound of formula (III)

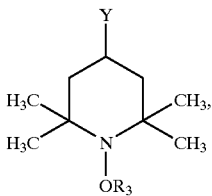
(III)

wherein
$R_3$ has the meaning as defined above;
Y is H, $OR_{10}$, $NR_{10}R_{11}$, —O—C(O)—$R_{10}$ or $NR_{11}$—C(O)—$R_{10}$;
$R_{10}$ and $R_{11}$ independently are hydrogen, phenyl, $C_1$–$C_{18}$alkyl, $C_2$–$C_{18}$alkenyl, $C_2$–$C_{18}$alkynyl or $C_2$–$C_{18}$alkyl which is substituted by at least one hydroxy group or, if Y is $NR_{10}R_{11}$, taken together, form a $C_2$–$C_{12}$alkylene bridge or a $C_2$–$C_{12}$alkylene bridge interrupted by at least one O atom.

Among the most preferred compounds of formula III, those that are of particular use are where
$R_3$ is

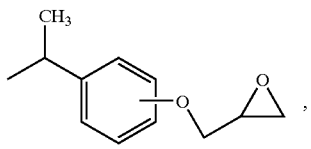

Y is H, $OR_{10}$, $NR_{10}R_{11}$, —O—C(O)—$R_{10}$ or $NR_{11}$—C(O)—$R_{10}$; and
$R_{10}$ and $R_{11}$ are independently hydrogen or $C_1$–$C_6$alkyl.

The glycidyl-nitroxyl initiators of the present invention may be prepared in different ways according to known methods. These methods are for example described in Macromol. Rapid Commun. 17, 149, 1996, Macromol Symp. 111, 47, (1996), Polym. Degr. Stab. 55, 323 (1997), Synlett 1996, 330, and U.S. Pat. Nos. 5,498,679 and 4,921,962.

The method of reacting the nitroxyl with the corresponding ethylene glycidylether in the presence of t-butyl hydroperoxide as described in U.S. Pat. No. 4,921,962 is a preferred method. As described in Tetrahedron Lett. 37, 4919, 1996, the reaction may also be carried out photochemically in the presence of di-t-butyl peroxide.

The starting phenylglycidylethers are known and either commercially available or may be prepared according to EP 226543.

The oligomers, polymers, cooligomers or copolymers (block or random) of narrow molecular weight distribution and which are employed as compatibilizing agents for the polymer blends of the instant invention are prepared by free radical polymerization of at least one ethylenically unsaturated monomer/oligomer, which comprises (co)polymerizing the monomer or monomers/oligomers in the presence of an initiator compound of formula (Ia) or (Ib) under reaction conditions capable of effecting scission of the O—$R_3$ (O—C) bond to form two free radicals, the radical •$R_3$ being capable of initiating polymerization.

Preferably the process is carried out in such a way that the scission of the O—C bond is effected by, heating ultrasonic treatment or exposure to electromagnetic radiation, ranging from γ to microwaves.

More preferred the scission of the O—C bond is effected by heating and takes place at a temperature of between 50° C. and 180° C. Preferred initiators are mentioned above.

The process may be carried out in the presence of an organic solvent or in the presence of water or in mixtures of organic solvents and water. Additional co-solvents or surfactants, such as glycols or ammonium salts of fatty acids, may be present. Other suitable co-solvents are described hereinafter.

Preferred processes use as little solvents as possible. In the reaction mixture it is preferred to use more than 30% by weight of monomer and initiator, particularly preferably more than 50% and most preferably more than 80%.

If organic solvents are used, suitable solvents or mixtures of solvents are typically pure alkanes (hexane, heptane, octane, isooctane), hydrocarbons (benzene, toluene, xylene), halogenated hydrocarbons (chlorobenzene), alkanols (methanol, ethanol, ethylene glycol, ethylene glycol monomethyl ether), esters (ethyl acetate, propyl, butyl or hexyl acetate) and ethers (diethyl ether, dibutyl ether, ethylene glycol dimethyl ether), or mixtures thereof.

The aqueous polymerization reactions can be supplemented with a water-miscible or hydrophilic co-solvent to help ensure that the reaction mixture remains a homogeneous single phase throughout the monomer conversion. Any water-soluble or water-miscible co-solvent may be used, as long as the aqueous solvent medium is effective in providing a solvent system which prevents precipitation or phase separation of the reactants or polymer products until after all polymerization reactions have been completed. Exemplary co-solvents useful in the present invention may be selected from the group consisting of aliphatic alcohols, glycols, ethers, glycol ethers, pyrrolidines, N-alkyl pyrrolidinones, N-alkyl pyrrolidones, polyethylene glycols, polypropylene glycols, amides, carboxylic acids and salts thereof, esters, organosulfides, sulfoxides, sulfones, alcohol derivatives, hydroxyether derivatives such as butyl carbitol or cellosolve, amino alcohols, ketones, and the like, as well as derivatives thereof and mixtures thereof. Specific examples include methanol, ethanol, propanol, dioxane, ethylene glycol, propylene glycol, diethylene glycol, glycerol, dipropylene glycol, tetrahydrofuran, and other water-soluble or water-miscible materials, and mixtures thereof. When mixtures of water and water-soluble or water-miscible organic liquids are selected as the aqueous reaction media, the water to co-solvent weight ratio is typically in the range of about 100:0 to about 10:90.

When monomer mixtures or monomer/oligomer mixtures are used, the calculation of mol % is based on an average molecular weight of the mixture.

Hydrophilic monomers, polymers and copolymers of the present invention can be separated from one another or from the polymerization reaction mixture by, for example, changing the pH of the reaction media and by other well known conventional separation techniques.

The polymerization temperature may range from about 50° C. to about 180° C., preferably from about 80° C. to about 150° C. At temperatures above about 180° C., the controlled conversion of the monomer into polymer decreases, and uncertain and undesirable by-products like thermally initiated polymer are formed or destruction of the polymerization regulator may occur. Frequently, these by-products discolor the polymer mixture and a purification step may be required to remove them, or they may be intractable.

Therefore the surprisingly high reactivity of the present initiators which are already active at relatively low temperatures leads to short reaction times. The resulting polymers are usually colorless and they can be used in most cases without any further purification step. This is an important advantage when industrial scale-up is considered.

After the polymerizing step is complete, the formed (co)polymer obtained is isolated. The isolating step of the present process is conducted by known procedures, e.g. by distilling off the unreacted monomer or by precipitation in a suitable non-solvent, filtering the precipitated polymer followed by washing and drying the polymer.

Block copolymers may be prepared and involves at least two stages, which comprises forming a polymer with alkoxyamine end groups of the general structure of formula (IVa) or (IVb)

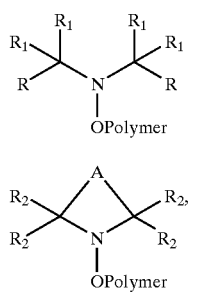

wherein
  $R_1$, $R_2$ and A are as defined above including the preferences, the polymer containing the initiator group —$R_3$ and having the oxyamine group essentially attached as terminal group, and adding a further monomer followed by heating to form a block copolymer by radical initiated polymerization.

The polymer of formula (IVa) or (IVb) may be isolated prior to the next reaction step or it may be used without isolation, and the second monomer is added to the reaction mixture of the first step.

Furthermore, block copolymers of this invention may consist of blocks which alternate between polar monomers and non-polar monomers.

The (co)polymers of the present invention may have a number average molecular weight from 1,000 to 400,000 g/mol, preferably from 2,000 to 250,000 g/mol and, more preferably, from 2,000 to 200,000 g/mol. When produced in bulk, the number average molecular weight may be up to 500,000 (with the same minimum weights as mentioned above). The number average molecular weight may be determined by size exclusion chromatography (SEC), gel permeation chromatography (GPC), matrix assisted laser desorption/ionization mass spectrometry (MALDI-MS) or, if the initiator carries a group which can be easily distinguished from the monomer(s), by NMR spectroscopy or other conventional methods.

Because the present polymerization is a "living" polymerization, it can be started and stopped practically at will. Furthermore, the polymer product retains the functional alkoxyamine group allowing a continuation of the polymerization in a living matter. Thus, once the first monomer is consumed in the initial polymerizing step a second monomer can then be added to form a second block on the growing polymer chain in a second polymerization step. Therefore it is possible to carry out additional polymerizations with the same or different monomer(s) to prepare multi-block copolymers.

Furthermore, since this is a radical polymerization, blocks can be prepared in essentially any order. One is not necessarily restricted to preparing block copolymers where the sequential polymerizing steps must flow from the least stabilized polymer intermediate to the most stabilized polymer intermediate, such as is the case in ionic polymerization. Thus it is possible to prepare a multi-block copolymer in which a polyacrylonitrile or a poly(meth)acrylate block is prepared first, then a styrene or butadiene block is attached thereto, and so on.

Furthermore, there is no linking group required for joining the different blocks of the present block copolymer. One can simply add successive monomers to form successive blocks.

The oligomers, polymers, cooligomers or copolymers of the present invention contain at least one initiator group —$R_3$ and at least one oxyamine group of formula

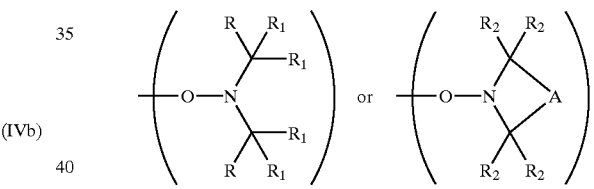

wherein
  A, $R_1$ and $R_2$ are as defined above.

Typically the amount of the initiator compound of formula (Ia) or (Ib) is in the range of 0.01 mol-% to 30 mol-% based on the monomer, oligomer or monomer/oligomer mixture used. If monomer mixtures are used the average molecular weight is taken for calculating mol-%.

The initiator compound of formula (Ia) or (Ib) is preferably present in an amount of 0.01 mol-% to 10 mol-%, more preferably in an amount of 0.05 mol-% to 5 mol-%, based on the monomer, oligomer or monomer/oligomer mixture used.

The monomers suitable for use in the present invention may be water-soluble or water-insoluble. Water soluble monomers contain typically a salt of a carboxylic acid group. Water insoluble monomers are typically free of acid and phenolic groups. Typical metal atoms are Na, K or Li.

Typical monoethylenically unsaturated monomers free of carboxylic acid and phenolic groups which are suitable for this invention include the alkyl esters of acrylic or methacrylic acids such as methyl acrylate, ethyl acrylate, butyl acrylate, methyl methacrylate, ethyl methacrylate, butyl methacrylate and isobutyl methacrylate; the hydroxyalkyl esters of acrylic or methacrylic acids, such as hydroxyethyl acrylate, hydroxypropyl acrylate, hydroxyethyl methacrylate, and hydroxypropyl methacrylate; acrylamide, methacrylamide, N-tertiary butylacrylamide, N-methylacrylamide, N,N-dimethylacrylamide; acrylonitrile, methacrylonitrile, allyl alcohol, dimethylaminoethyl acrylate, dimethylaminoethyl methacrylate, phosphoethyl methacrylate, N-vinylpyrrolidone, N-vinylformamide, N-vinylimidazole, vinyl acetate, conjugated dienes such as butadiene or isoprene, styrene, styrenesulfonic acid salts, vinylsulfonic acid salts and 2-acrylamido-2-methylpropane-sulfonic acid salts and acryloyl chloride.

Preferred ethylenically unsaturated monomers or oligomers are selected from the group consisting of styrene, substituted styrene, conjugated dienes, acrolein, vinyl acetate, (alkyl)acrylic acidanhydrides, (alkyl)acrylic acid salts, (alkyl)acrylic esters and (alkyl)acrylamides.

Particularly preferred ethylenically unsaturated monomers are styrene, α-methylstyrene, p-methylstyrene, isoprene and butadiene.

In a most preferred composition the ethylenically unsaturated monomer is styrene.

Preferred acrylates are methylacrylate, ethylacrylate, butylacrylate, isobutylacrylate, t-butylacrylate, hydroxyethylacrylate, hydroxypropylacrylate, dimethylaminoethylacrylate, glycidylacrylates, methyl (meth)acrylate, ethyl(meth)acrylate, butyl(meth)acrylate, hydroxyethyl-(meth)acrylate, hydroxypropyl(meth)acrylate, dimethylaminoethyl(meth)acrylate, glycidyl(meth) acrylates, acrylonitrile, acrylamide or methacrylamide.

Examples for $C_8$–$C_{16}$ ethylenically unsaturated phenolics, which may also be used as comonomers include 4-hydroxystyrene, 4-hydroxy-α-methylstyrene, and 2,6-di-tert-butyl4-vinylphenol.

Another class of carboxylic acid monomers suitable for use as comonomers in this invention are the alkali metal and ammonium salts of $C_4$–$C_6$-ethylenically unsaturated dicarboxylic acids. Suitable examples include maleic acid, maleic anhydride, itaconic acid, mesaconic acid, fumaric acid and citraconic acid. Maleic anhydride (and itaconic acid are) is the preferred monoethylenically unsaturated dicarboxylic acid monomer(s).

The acid monomers suitable for use in this invention are in the form of the alkali metal salts or ammonium salts of the acid.

The polyphenylene ethers and polyamides of the present invention are as described in U.S. Pat. No. 5,100,961, the relevant parts of which are incorporated herein by reference.

The polyphenylene ethers comprise a plurality of structural units having the formula

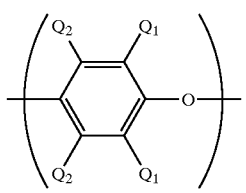

(V)

and in each of said units independently, each $Q_1$ is independently halogen, primary or secondary alkyl of 1 to 7 carbon atoms, phenyl, haloalkyl, aminoalkyl, hydrocarbonoxy, or halohydrocarbonoxy wherein at least two carbon atoms separate the halogen and oxygen atoms; and each $Q_2$ is independently hydrogen, halogen, primary or secondary alkyl of 1 to 7 carbon atoms, phenyl, haloalkyl, hydrocarbonoxy or halohydrocarbonoxy as defined for $Q_1$.

Examples of primary alkyl of 1 to 7 carbon atoms suitable as $Q_1$ and $Q_2$ are methyl, ethyl, n-propyl, n-butyl, isobutyl, n-amyl, isoamyl, 2-methylbutyl, n-hexyl, 2,3-dimethylbutyl, 2-, 3- or 4-methylpentyl and the corresponding heptyl groups. Examples of secondary alkyl of 1 to 7 carbon atoms are isopropyl and sec-butyl.

Preferably, any alkyl radicals are straight chain rather than branched. Most often, each $Q_1$ is alkyl or phenyl, especially $C_{1-4}$ alkyl, and each $Q_2$ is hydrogen. Suitable polyphenylene ethers are disclosed in a large number of patents.

Both homopolymer and copolymer polyphenylene ethers are included. Suitable homopolymers are those containing, for example 2,6-dimethyl-1,4-phenylene ether units. Suitable copolymers include random copolymers containing such units in combination with, for example, 2,3,6-trimethyl-1,4-phenylene ether units. Many suitable random copolymers, as well as homopolymers, are disclosed in the patent literature.

Also included are polyphenylene ethers containing moieties which modify properties such as molecular weight, melt viscosity and/or impact strength. Such polymers are described in the patent literature and may be prepared by grafting onto the polyphenylene ether in known manner monomers such as acrylonitrile or styrene, or polymers such as polystyrenes or elastomers. The product typically contains both grafted and ungrafted moieties. Other suitable polymers are the coupled polyphenylene ethers in which the coupling agent is reacted in known manner with the hydroxy groups of two polyphenylene ether chains to produce a higher molecular weight polymer containing the reaction product of the hydroxy groups and the coupling agent. Illustrative coupling agents are low molecular weight polycarbonates quinones, heterocycles and formals.

The polyphenylene ether generally has a number average molecular weight within the range of about 3,000–40,000 and a weight average molecular weight within the range of about 20,000–80,000, as determined by gel permeation chromatography. Its intrinsic viscosity is most often in the range of about 0.15–0.6 dl/g, as measured in chloroform at 25° C.

The polyphenylene ethers are typically prepared by the oxidative coupling of at least one corresponding monohydroxyaromatic compound. Particularly useful and readily available monohydroxyaromatic compounds are 2,6-xylenol, wherein each $Q_1$ is methyl and each $Q_2$ is hydrogen and wherein the resultant polymer is characterized as a poly(2,6-dimethyl-1,4-phenylene ether), and 2,3,6-trimethylphenol, wherein each $Q_1$ and one $Q_2$ are methyl and the other $Q_2$ is hydrogen.

A variety of catalyst systems are known for the preparation of polyphenylene ethers by oxidative coupling. There is no particular limitation as to catalyst choice and any of the known catalysts can be used. For the most part, they contain at least one heavy metal compound such as a copper, manganese or cobalt compound, usually in combination with various other materials. A first preferred catalyst systems consist of those containing a copper compound. Such catalysts are disclosed in references cited in U.S. Pat. No. 5,100,961. They are usually combinations of cuprous or cupric ions, halide (e.g. chloride, bromide or iodide) ions and at least one amine.

A second preferred class of catalyst systems are those containing manganese compounds. They are generally alkaline systems in which divalent manganese is combined with such anions as halide, alkoxide or phenoxide. Most often the manganese is present as a complex with one or more complexing and/or chelating agents such as dialkylamines, alkanolamines, alkylenediamines, o-hydroxyaromatic aldehydes, o-hydroxyazo compound, ω-hydroxyoximes (monomeric and polymeric), o-hydroxyaryl oximes and β-diketones. Also useful are known cobalt-containing catalyst systems. Suitable manganese and cobalt-containing catalyst systems for polyphenylene ether preparation are known in the art by reason of disclosure in numerous patents and publications.

The polyphenylene ethers which may be employed for the purposes of this invention include those which comprise molecules having at least one of the end groups of the formulae

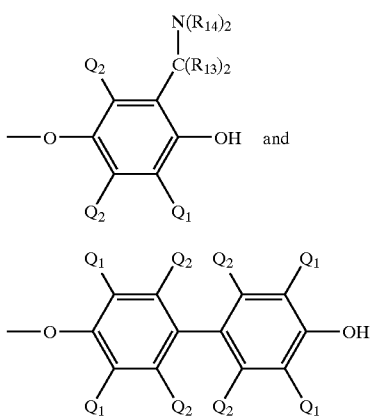

wherein $Q_1$ and $Q_2$ are as previously defined; each $R_{13}$ is independently hydrogen or alkyl, with the proviso that the total number of carbon atoms in both $R_{13}$ radicals is 6 or less; and each $R_{14}$ is independently hydrogen or a $C_{1-6}$ primary alkyl radical. Preferably, each $R_{13}$ is hydrogen and each $R_{14}$ is alkyl, especially methyl or n-butyl.

Polymers containing the aminoalkyl-substituted end groups of formulae (VI) are typically obtained by incorporating an appropriate primary or secondary monoamine as one of the constituents of the oxidative coupling reaction mixture, especially when a copper- or manganese-containing catalyst is used. Such amines, especially the dialkylamines and preferably di-n-butylamine and dimethylamine, frequently become chemically bound to the polyphenylene ether, most often by replacing one of the a-hydrogen atoms on one or more $Q_1$ radicals. The principal site of reaction is the $Q_1$ radical adjacent to the hydroxy group on the terminal unit of the polymer chain. During further processing and/or blending, the aminoalkyl-substituted end groups may undergo various reactions, probably involving a quinone methide-type intermediate of the formula

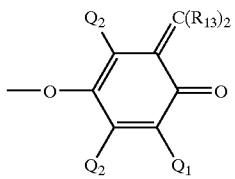

with numerous beneficial effects often including an increase in impact strength and compatibilization with other blend components, as pointed out in references cited in U.S. Pat. No. 5,100,961.

Polymers with 4-hydroxybiphenyl end groups of formula (VII) are often especially useful in the present invention. They are typically obtained from reaction mixtures in which a by-product diphenoquinone of the formula

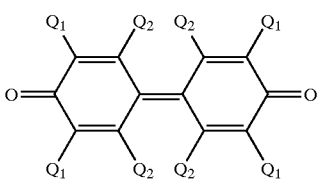

is present, especially in a copper-halide-secondary or tertiary amine system, as cited in references in U.S. Pat. No. 5,100,961. In mixtures of this type, the diphenoquinone is ultimately incorporated into the polymer in substantial proportions, largely as an end group.

In many polyphenylene ethers obtained under the above-described conditions, a substantial proportion of the polymer molecules, typically constituting as much as about 90 % by weight of the polymer, contain end groups having one or frequently both of formulae (VI) and (VII). It should be understood, however, that other end groups may be present and that the invention in its broadest sense may not be dependent on the molecular structures of the polyphenylene ether end groups.

The use of polyphenylene ethers containing substantial amounts of un-neutralized amino nitrogen may afford compositions with undesirably low impact strengths. The amino compounds include, in addition to the aforementioned aminoalkyl end groups, traces of amine (particularly secondary amine) in the catalyst used to form the polyphenylene ether.

The present invention therefore includes the use of polyphenylene ethers in which a substantial proportion of amino compounds has been removed or inactivated. Polymers so treated contain un-neutralized amino nitrogen, if any, in amounts no greater than 800 ppm and more preferably in the range of about 100–800 ppm.

A preferred method of inactivation is by extrusion of the polyphenylene ether at a temperature within the range of about 230–350° C., with vacuum venting. This is preferably achieved in a preliminary extrusion step, by connecting the vent of the extruder to a vacuum pump capable of reducing the pressure to about 200 torr or less. There may also be advantages in employing vacuum venting during extrusion of the composition of this invention.

It is believed that this inactivation method aids in the removal by evaporation of any traces of free amines (predominantly secondary amines) in the polymer, including amines generated by conversion of aminoalkyl end groups to quinone methides as above.

It will be apparent to those skilled in the art from the foregoing that the polyphenylene ethers contemplated for use in the present invention include all those presently known, irrespective of variations in structural units or ancillary chemical features.

The polymer containing amine end groups to be blended with the polyphenylene ethers or polystyrenes of the present invention is preferably a polyamide. Included are those prepared by the polymerization of a monoamino-monocarboxylic acid or a lactam thereof having at least 2 carbon atoms between the amino and carboxylic acid group, of substantially equimolar proportions of a diamine which contains at least 2 carbon atoms between the amino groups and a dicarboxylic acid, or of a monoaminocarboxylic acid or a lactam thereof as defined above together with substantially equimolar proportions of a diamine and a dicarboxylic acid. The term "substantially equimolar" proportions includes both strictly equimolar proportions and slight departures therefrom which are involved in conventional techniques for stabilizing the viscosity of the resultant polyamides. The dicarboxylic acid may be used in the form of a functional derivative thereof, for example, an ester or acid chloride.

Examples of the aforementioned monoamino-monocarboxylic acids or lactams thereof which are useful in preparing the polyamides include those compounds containing from 2 to 16 carbon atoms between the amino and carboxylic acid groups, said carbon atoms forming a ring containing the —CO—NH— group in the case of a lactam. As particular examples of aminocarboxylic acids and lactams there may be mentioned ε-aminocaproic acid, butyrolactam, pivalolactam, ε-caprolactam, capryllactam, enantholactam, undecanolactam, dodecanolactam and 3- and 4-aminobenzoic acids.

Diamines suitable for use in the preparation of the polyamides include the straight chain and branched chain alkyl, aryl and alkaryl diamines. Illustrative diamines are trimethylenediamine, tetramethylenediamine, pentamethylenediamine, octamethylenediamine, hexamethylenediamine (which is often preferred), trimethylhexamethylenediamine, m-phenylenediamine and m-xylylenediamine.

The dicarboxylic acids may be represented by the formula

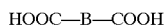

wherein

B is a divalent aliphatic or aromatic group containing at least 2 carbon atoms. Examples of aliphatic acids are sebacic acid, octadecanedioic acid, suberic acid, glutaric acid, pimelic acid and adipic acid.

Both crystalline and amorphous polyamides may be employed, with the crystalline species often being preferred by reason of their solvent resistance. Typical examples of the polyamides or nylons, as these are often called, include, for example, polyamide-6 (polycaprolactam), 6,6 (polyhexamethylene adipamide), 11, 12, 4,6, 6,10 and 6,12 as well as polyamides from terephthalic acid and/or isophthalic acid and trimethylhexamethylenediamine; from adipic acid and m-xylylenediamines; from adipic acid, azelaic acid and 2,2-bis(p-aminophenyl)propane or 2,2-bis-(p-aminocyclohexyl)propane and from terephthalic acid and 4,4'-diaminodicyclohexylmethane. Mixtures and/or copolymers of two or more of the foregoing polyamides or prepolymers thereof, respectively, are also within the scope of the present invention. Preferred polyamides are polyamide-6, 4,6, 6,6, 6,9, 6,10, 6,12, 11 and 12, most preferably polyamide-6,6.

Examples of polyesters that form useful blends with polyphenylene ether and polystyrene, which blends may be compatibilized with the (co)oligomers or (co)polymers containing glycidyl and oxyamine groups of the instant invention are: Polyethylene terephthalate (PET), polybutylene terephthalate (PBT), polytrimethylene terephthalate (PTT), polycyclohexane-1,4-dimethyleneterephthalate (PCT), copolymers of PET and PCT, commonly known as PETG, polyethylene 2,6-naphthalate (PEN) and copolymers of PET and PEN.

For the preparation of copolymer compositions according to this invention, a blending method which results in the formation of an intimate blend is required. Suitable procedures include solution blending, although such procedures are of limited applicability to many polyamides by reason of their insolubility in most common solvents. For this reason and because of the availability of melt blending equipment in commercial polymer processing facilities, melt reaction procedures are generally preferred. Conventional melt blending procedures and equipment may be employed, with extrusion often preferred because of its relative convenience and particular suitability. Typical reaction temperatures are in the range of about 175°–350° C.

Those skilled in the art will be familiar with blending methods and apparatus capable of intimately blending resinous constituents, especially by kneading. They are exemplified by disc-pack processors and various types of extrusion equipment. Illustrations of the latter are continuous mixers; single screw kneading extruders; counter-rotating, non-intermeshing twin screw extruders having screws which include forward-flighted compounders, cylindrical bushings and/or left-handed screw elements; co-rotating, intermeshing twin screw extruders; and extruders having screws which include at least one and preferably at least two sections of kneading block elements. As previously mentioned, vacuum venting may also be advantageous at this stage.

It is within the scope of the invention to include in the blending step elastomeric impact modifiers compatible with either or both of the polymers of components i.) and ii.).

Impact modifiers for polyphenylene ether-polyamide compositions are well known in the art. They are typically derived from one or more monomers selected from the group consisting of olefins, vinyl aromatic monomers, acrylic and alkylacrylic acids and their ester derivatives as well as conjugated dienes. Especially preferred impact modifiers are the rubbery high-molecular weight materials including natural and synthetic polymeric materials showing elasticity at room temperature. They include both homopolymers and copolymers, including random, block, radial block, graft and core-shell copolymers as well as combinations thereof.

Polyolefins or olefin-based copolymers employable in the invention include low density polyethylene, high density polyethylene, linear low density polyethylene, isotactic polypropylene, poly(1-butene), poly(4-methyl-1-pentene), propylene-ethylene copolymers and the like. Additional olefin copolymers include copolymers of one or more α-olefins, particularly ethylene, with copolymerizable monomers including, for example, vinyl acetate, acrylic acids and alkylacrylic acids as well as the ester derivatives thereof including, for example, acrylic acid, ethyl acrylate, methacrylic acid, methyl methacrylate and the like. Also suitable are the ionomer resins, which may be wholly or partially neutralized with metal ions.

A particularly useful class of impact modifiers are those derived from the vinyl aromatic monomers. These include AB and ABA type block and radial block copolymers and vinyl aromatic conjugated diene core-shell graft copolymers.

An especially preferred subclass of vinyl aromatic monomer-derived resins is the block copolymers comprising monoalkenyl arene (usually styrene) blocks and conjugated diene (e.g., butadiene or isoprene) or olefin (e.g., ethylene-propylene, ethylene-butylene) blocks and represented as AB and ABA block copolymers. The conjugated diene blocks may be partially or entirely hydrogenated, whereupon the properties are similar to the olefin block copolymers.

Suitable AB type block copolymers are disclosed in, for example, U.S. Pat. Nos. 3,078,254; 3,402,159; 3,297,793; 3,265,765 and 3,594,452 and UK Patent 1,264,741, all incorporated herein by reference. Examples of typical species of AB block copolymers include: Polystyrene-polybutadiene (SBR), polystyrene-polyisoprene and poly(α-methylstyrene)-polybutadiene.

Such AB block copolymers are available commercially from a number of sources, including Phillips Petroleum under the trademark SOLPRENE.

Additionally, ABA triblock copolymers and processes for their production as well as hydrogenation, if desired, are disclosed in U.S. Pat. Nos. 3,149,182; 3,231,635; 3,462,162; 3,287,333; 3,595,942; 3,694,523 and 3,842,029, all incorporated herein by reference.

Examples of triblock copolymers include: Polystyrene-polybutadiene-polystyrene (SBS), polystyrene-polyisoprene-polystyrene (SIS), poly($\alpha$-methylstyrene)-polybutadiene-poly($\alpha$-methylstyrene) and poly($\alpha$-methylstyrene)-polyisoprene-poly($\alpha$-methylstyrene).

Particularly preferred triblock copolymers are available commercially as CARIFLEX®, KRATON D®, KRATON G® and KRATON® FG from Shell Chemicals.

Another class of impact modifiers is derived from conjugated dienes. While many copolymers containing conjugated dienes have been discussed above, additional conjugated diene modifier resins include, for example, homopolymers and copolymers of one or more conjugated dienes including, for example, polybutadiene, butadiene-styrene copolymers, isoprene-isobutylene copolymers, chlorobutadiene polymers, butadiene-acrylonitrile copolymers, polyisoprene, and the like. Ethylene-propylene-diene monomer rubbers may also be used. These EPDM's are typified as comprising predominantly ethylene units, a moderate amount of propylene units and up to about 20 mole percent of non-conjugated diene monomer units. Many such EPDM's and processes for the production thereof are disclosed in U.S. Pat. Nos. 2,933,480; 3,000,866; 3,407,158; 3,093,621 and 3,379,701, incorporated herein by reference.

Other suitable impact modifiers are the core-shell type graft copolymers. In general, these have a predominantly conjugated diene rubbery core or a predominantly cross-linked acrylate rubbery core and one or more shells polymerized thereon and derived from monoalkenylarene and/or acrylic monomers alone or, preferably, in combination with other vinyl monomers. Such core-shell copolymers are widely available commercially, for example, from Rohm and Haas Company under the trade names KM-611, KM-653 and KM-330, and are described in U.S. Pat. Nos. 3,808,180; 4,034,013; 4,096,202; 4,180,494 and 4,292,233.

Also useful are the core-shell copolymers wherein an interpenetrating network of the resins employed characterizes the interface between the core and shell. Especially preferred in this regard are the ASA type copolymers available from General Electric Company and sold as GELOY™ resin and described in U.S. Pat. No. 3,944,631.

In addition, there may be employed the above-described polymers and copolymers having copolymerized therewith or grafted thereon monomers having functional groups and/or polar or active groups. Finally, other suitable impact modifiers include Thiokol rubber, polysulfide rubber, polyurethane rubber, polyether rubber (e.g., polypropylene oxide), epichlorohydrin rubber, ethylene-propylene rubber, thermoplastic polyester elastomers and thermoplastic etherester and ether-amide elastomers.

The proportion of impact modifier or other resinous material is subject to wide variation. Impact modifiers such as diblock or triblock copolymers are usually present in an amount up to about 50 parts per 100 parts of the polymer of component i).

Provided the necessity for intimate blending is strictly observed, the order of blending may be varied. It is often found advantageous to employ an extruder which has at least two ports for introduction of ingredients, one such port being downstream from the other. The polymer of component i.) and at least a portion of the impact modifier are introduced through the first port and extruded. This portion of the extruder is often preferably vacuum vented.

The polyamide or polyester and any additional impact modifier are introduced through the downstream port and extrusion is continued, preferably at a lower temperature to minimize degradation of the impact modifier. By this method, optimum dispersion may be achieved, with either polymer being the continuous phase depending on proportion and method of blending.

The polymer blends of the instant invention may be further enhanced by the addition of polyamide stabilizers, for example copper salts in combination with iodides and/or phosphorus compounds and salts of divalent manganese, flow modifiers, fillers, flame retardants, pigments, dyes, stabilizers, anti-static agents, crystallization aids, mold release agents and the like, as well as resinous components not previously discussed.

The principal reaction which takes place between the glycidyl-nitroxide end-capped (co)oligomers and (co)polymers of the instant invention and the polyamide generally involves the amine end groups of the latter, which are nucleophilic and open the epoxide ring to form amino alcohol groups. Another possible reaction is between carboxylic acid end groups of the polyamide and the epoxy groups of the (co)oligomers and (co)polymers. In the case of polyesters, the carboxylic acid end groups are reactive towards glycidyl groups.

The amount of the glycidyl-nitroxide end-capped (co)oligomers or (co)polymers employed is generally in the range of about 5 % to about 30 % by weight, based on the overall formulation.

The proportions of the polymer of component i.) and the other polymer employed for the preparation of the compositions of this invention are not critical; they may be widely varied to provide compositions having the desired properties. Most often, the weight ratio of the two polymers are from about 1:10 to about 10:1. Preferably, the weight ratio of the polymer of component i.) and the other polymer is from about 3:7 to about 7:3.

In addition to epoxy-polymer-polyamide copolymer, or epoxy-polymer-polyester copolymer, the compositions of this invention also contain unreacted polyamide or polyester. In any event, molded parts produced from said compositions are generally ductile and have higher impact strengths than those produced from simple polymer blends, which are incompatible and often have poor mechanical properties as previously described.

The following Examples illustrate the invention in more detail. They are not to be construed as limiting the instant invention in any manner whatsoever. The invention is declared to cover all changes and modifications of the specific examples which do not constitute departure from the spirit and scope of the invention.

EXAMPLE 1

Preparation of 1-(4-Glycidyloxyphenyl)-1-(2,2,6,6-tetramethyl-4-n-propoxypiperidin-1-oxy)ethane A): A 70% aqueous solution of t-butylhydroperoxide (26.4 g) is extractively dehydrated in two portions with each of 25 g glycidyl 4-ethylphenyl ether. The organic extracts are combined, a molecular sieve is added and the mixture is stored under argon atmosphere.

B): A mixture of glycidyl 4-ethylphenyl ether (57 g), 4-propoxy-2,2,6,6-tetramethylpiperidine-1-oxyl (10.7 g) and molybdenum(VI)oxide (0.72 g) are purged with argon for one hour. The mixture is then heated up to 70° C. and the solution prepared under A) is added under stirring within 30 minutes. Pressure is reduced to 200 mbar and the mixture is heated for 18 hours at 100° C. After the reaction is completed the mixture is cooled to room temperature and the pressure is allowed to raise to normal pressure. Ethyl acetate and water are added. The water phase is separated and extracted once with ethyl acetate. The organic phases are combined, washed with a 10% solution of sodium ascorbate and in a second step with water, dried over sodium sulfate and concentrated. Excessive amounts of glycidyl 4-ethylphenyl ether are removed at 80° C./0.01 mbar. The raw product is purified by chromatography on silica with a 7:1 mixture of petrolether/ethyl acetate as the eluent. A clear colorless oil is obtained, corresponding to the compound of formula (101).

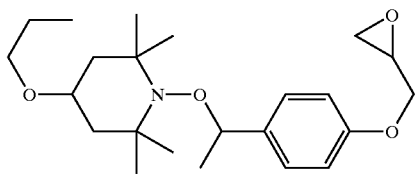

(101)

Elemental Analysis: calculated for $C_{23}H_{37}NO_4$: 70.55% C; 9.52% H; 3.57% N; found: 70.66% C; 9.60% H; 3.43% N.

EXAMPLE 2

Polymerization of Styrene

In a Schlenk tube the amount of 1-(4-glycidyloxyphenyl)-1-(2,2,6,6-tetramethyl-4-n-propoxypiperidin-1-oxy)ethane (compound 101) in Table 1 is dissolved in 50 mL of distilled styrene. The solution is degassed according to the freeze and thaw technique and flushed with argon. After heating for 6 hours in an oil bath to the temperature given in table 1 the excess monomer is removed under vacuum and the resulting white polymer is dried in a drying oven under vacuum. Weight average ($\overline{M}w$) and number average ($\overline{M}n$) molecular weights are determined using gel permeation chromatography (GPC). Results are given in Table 1.

TABLE 1

| Run | Temp. (° C.) | Compound 101 (g, mmol) | Conversion (percent) | $\overline{M}w$ | $\overline{M}n$ | $\overline{M}w/\overline{M}n$ |
|---|---|---|---|---|---|---|
| 1 | 120 | 0.170, 0.435 | 36 | 45500 | 32800 | 1.39 |
| 2 | 120 | 0.392, 1.00 | 16 | 13480 | 8620 | 1.56 |
| 3 | 130 | 0.170, 0.435 | 52 | 59400 | 44100 | 1.32 |

EXAMPLE 3

Impact Strength and Tensile Properties of PPE/PA-6,6 Blends

The formulations tested are described in Table 2 below. All amounts are percent by weight of the overall formulation.

TABLE 2

| Formulation No. | PPE | PA-6,6 | Impact Modifier | PS |
|---|---|---|---|---|
| 1 | 50 | 50 | — | — |
| 2 | 45 | 45 | 10 | — |
| 3 | 45 | 45 | 10 | — |

TABLE 2-continued

| Formulation No. | PPE | PA-6,6 | Impact Modifier | PS |
|---|---|---|---|---|
| 4 | 40 | 40 | 10 | 10 |
| 5 | 37.5 | 37.5 | 10 | 15 |

The polyphenylene ether (PPE) is a poly(2,6-dimethyl-1,4-phenylene ether), BLENDEX® HPP820, available from GE Specialty Chemicals, with a specific gravity of 1.06 g/cm³ and an intrinsic viscosity in chloroform at 25° C. of 0.4 dl/g.

The polyamide (PA-6,6) is a commercially available polyamide-6,6, ZYTEL® 101L, available from DuPont.

The impact modifier is KRATON® FG, available from Shell Chemicals, a maleic anhydride functionalized triblock copolymer with polystyrene end-blocks and poly(ethylene/butylene) mid-blocks.

The polystyrene (PS) is a polystyrene of the present invention prepared as above and has a $\overline{M}w$ of 4500.

Mixtures of the formulations of Table 2 are dry-blended and extruded with a 27 mm Leistritz twin crew extruder at 235, 265, 270 and 275° C. The extruded pellets are injection molded in a BOY 50M injection molder at 255, 265 and 275° C. with a nozzle temperature of 275° C. and a mold temperature.

The formulations of Table 2 are tested for Notched Izod impact strength according to ASTM method D256. Results are given in Table 3 below. The formulations of Table 2 are also tested for tensile properties according to ASTM method D638.

TABLE 3

| Formulation No. | Notched Izod Impact Strength (ft.lb./in) | Tensile Strength at Break (kg/mm²) | Total Elongation (percent) | Energy to Break (kg-mm) |
|---|---|---|---|---|
| 1 | 0.54 | 6.2 | 15 | 27 |
| 2 | 0.45 | 4.7 | 18 | 28 |
| 3 | 0.47 | 4.5 | 17 | 26 |
| 4 | 1.13 | 5.4 | 18 | 36 |
| 5 | 1.67 | 5.0 | 27 | 57 |

It is seen that the polyphenylene ether-polyamide mixtures blended with a polymer containing glycidyl and oxyamine groups of the instant invention exhibits outstanding mechanical properties as exhibited by impact strength and tensile properties.

EXAMPLE 4

Impact Strength and Tensile Properties of PPE/PA-6,6 Blends

The formulations tested are described in Table 4 below. All amounts are percent by weight of the overall formulation.

TABLE 4

| Formulation No. | PPE | PA-6,6 | Impact Modifier | PS MC3700 | PS Rad.Poly. | PS A | PS B |
|---|---|---|---|---|---|---|---|
| 6 | 50 | 50 | — | — | — | — | — |
| 7 | 45 | 45 | 10 | — | — | — | — |
| 8 | 37.5 | 37.5 | 10 | 15 | — | — | — |

TABLE 4-continued

| Formulation No. | PPE | PA-6,6 | Impact Modifier | PS MC3700 | PS Rad.Poly. | PS A | PS B |
|---|---|---|---|---|---|---|---|
| 9  | 37.5 | 37.5 | 10 | —  | 15 | —  | —  |
| 10 | 40   | 40   | 10 | —  | —  | 10 | —  |
| 11 | 37.5 | 37.5 | 10 | —  | —  | 15 | —  |
| 12 | 40   | 40   | 10 | —  | —  | —  | 10 |
| 13 | 37.5 | 37.5 | 10 | —  | —  | —  | 15 |

The polyphenylene ether (PPE) is a poly(2,6-dimethyl-1,4-phenylene ether), BLENDE® HPP820, available from GE Specialty Chemicals, with a specific gravity of 1.06 g/cm$^3$ and an intrinsic viscosity in chloroform at 25° C. of 0.4 dl/g.

The polyamide (PA-6,6) is a commercially available polyamide-6,6, ZYTEL® 101L, available from DuPont.

The impact modifier is KRATON® FG, available from Shell Chemicals, a maleic anhydride functionalized triblock copolymer with polystyrene end-blocks and poly(ethylenebutylene) mid-blocks.

The polystyrene PS MC3700 is a polystyrene of broad molecular weight distribution prepared by conventional radical polymerization, available from Chevron and has a $\overline{M}w$ of 205,000, a $\overline{M}n$ of 80,000 and a $\overline{M}w/\overline{M}n$ of 2.56.

The polystyrene PS Rad.Polym. is a polystyrene of broad molecular weight distribution prepared by conventional radical polymerization and has a $\overline{M}w$ of 25,900, a $\overline{M}n$ of 13,300 and a $\overline{M}w/\overline{M}n$ of 1.95.

The polystyrene PS A is a polystyrene of the present invention and is prepared as above and has a $\overline{M}w$ of 41,400, a $\overline{M}n$ of 30,500 and a $\overline{M}w/\overline{M}n$ of 1.36.

The polystyrene PS B is a polystyrene of the present invention and is prepared as above and has a $\overline{M}w$ of 8,800, a $\overline{M}n$ of 7,200 and a $\overline{M}w/\overline{M}n$ of 1.22.

Mixtures of the formulations of Table 4 are dry-blended and extruded with a 27mm Leistritz twin screw extruder at 235, 265, 270 and 275° C. The extruded pellets are injection molded in a BOY 50M injection molder at 255, 265 and 275° C. with a nozzle temperature of 275° C. and a mold temperature of 150° C.

The formulations of Table 4 are tested for Notched Izod impact strength according to ASTM method D256. Results are given in Table 5 below. The formulations of Table 4 are also tested for tenile properties according to ASTM method D638.

TABLE 5

| Formulation No. | Notched Izod Impact Strength (ft.lb./in) | Tensile Strength at Break (kg/mm$^2$) | Total Elongation (percent) | Energy to Break (kg-mm) |
|---|---|---|---|---|
| 6  | 0.7  | 6.8 | 14 | 22  |
| 7  | 0.45 | 4.8 | 17 | 24  |
| 8  | 0.8  | 5.6 | 16 | 26  |
| 9  | 0.9  | 5.6 | 16 | 25  |
| 10 | 0.9  | 5.6 | 24 | 44  |
| 11 | 1.4  | 6.0 | 31 | 67  |
| 12 | 1.2  | 5.5 | 23 | 43  |
| 13 | 1.6  | 6.1 | 82 | 205 |

It is seen that the polyphenylene ether-polyamide mixtures blended with a polymer containing glycidyl and oxyamine groups of the instant invention exhibits outstanding mechanical properties as exhibited by impact strength and tensile properties.

EXAMPLE 5

Impact Strength and Tensile Properties of PPE/PA-6 Blends

The experiments of Example 4 are repeated using polyamide-6 instead of polyamide-6,6. The polyphenylene ether-polyamide mixtures blended with a polymer containing glycidyl and oxyamine groups of the instant invention exhibits outstanding mechanical properties as exhibited by impact strength and tensile properties.

EXAMPLE 6

Impact Strength and Tensile Properties of PPE/Polyester Blends

The experiments of Example 4 are repeated using polyethylene terephthalate (PET), polybutylene terephthalate (PBT), polytrimethylene terephthalate (PTT), polycyclohexane-1,4-dimethyleneterephthalate (PCT), copolymers of PET and PCT, commonly known as PETG, polyethylene 2,6-naphthalate (PEN) and copolymers of PET and PEN instead of polyamide-6,6. The polyphenylene ether-polyester mixtures blended with a polymer containing glycidyl and oxyamine groups of the instant invention exhibit outstanding mechanical properties as exhibited by impact strength and tensile properties.

EXAMPLE 7

Impact Strength and Tensile Properties of Polystyrene/Polyamide Blends

The experiments of Example 4 are repeated using polystyrene instead of polyphenylene ether. The polystyrene-polyamide mixtures blended with a polymer containing glycidyl and oxyamine groups of the instant invention exhibits outstanding mechanical properties as exhibited by impact strength and tensile properties.

EXAMPLE 8

Impact Strength and Tensile Properties of Polystyrene/Polyester Blends

The experiments of Example 6 are repeated using polystyrene instead of polyphenylene ether. The polystyrene-polyester mixtures blended with a polymer containing glycidyl and oxyamine groups of the instant invention exhibits outstanding mechanical properties as exhibited by impact strength and tensile properties.

What is claimed is:
1. A composition comprising
   i.) a polymer selected from the group consisting of polyphenylene ether and polystyrene,
   ii.) at least one other polymer containing amine or carboxylic acid end groups,
   iii.) an oligomer, polymer, cooligomer or copolymer prepared by free-radical polymerization of at least one ethylenically unsaturated monomer or oligomer in the presence of a glycidyl-functionalized nitroxyl initiator, and
   iv.) an elastomeric impact modifier,
wherein the glycidyl-functionalized nitroxyl initiator is of the formula

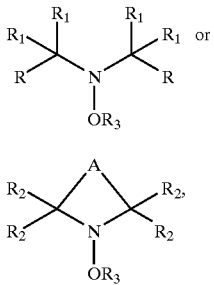

(Ia)

(Ib)

wherein

R are independently hydrogen, halogen, NO$_2$, cyano, —CONR$_5$R$_6$, —(R$_9$)COOR$_4$, —C(O)—R$_7$, —OR$_8$, —SR$_8$, —NHR$_8$, —N(R$_8$)$_2$, carbamoyl, di(C$_1$–C$_{18}$alkyl)carbamoyl, —C(=NR$_5$)(NHR$_6$) or R has the same definition as R$_1$;

R$_1$ are independently unsubstituted C$_1$–C$_{18}$alkyl, C$_2$–C$_{18}$alkenyl, C$_2$–C$_{18}$alkynyl, C$_7$–C$_9$phenylalkyl, C$_3$–C$_{12}$cycloalkyl or C$_2$–C$_{12}$heterocycloalkyl; or C$_1$–C$_{18}$alkyl, C$_2$–C$_{18}$alkynyl, C$_2$–C$_{18}$alkynl, C$_7$–C$_9$phenylalkyl, C$_3$–C$_{12}$cycloalkyl or C$_2$–C$_{12}$heterocycloalkyl, which are substituted by NO$_2$, halogen, amino, hydroxy, cyano, carboxy, C$_1$–C$_4$alkoxy, C$_1$–C$_4$alkylthio, C$_1$–C$_4$alkylamino or di(C$_1$–C$_4$alkyl)amino; or phenyl, naphthyl, which are unsubstituted or substituted by C$_1$–C$_4$alkyl, C$_1$–C$_4$alkoxy, C$_1$–C$_4$alkylthio, halogen, cyano, hydroxy, carboxy, C$_1$–C$_4$alkylamino or di(C$_1$–C$_4$alkyl)amino;

R$_4$ is hydrogen, C$_1$–C$_{18}$alkyl, phenyl, an alkali metal cation or a tetraalkylammonium cation;

R$_5$ and R$_6$ are hydrogen, C$_1$–C$_{18}$alkyl, C$_2$–C$_{18}$alkyl which is substituted by at least one hydroxy group or, taken together, form a C$_2$–C$_{12}$alkylene bridge or a C$_2$–C$_{12}$-alkylene bridge interrupted by at least one O or/and NR$_8$ atom;

R$_7$ is hydrogen, C$_1$–C$_{18}$alkyl or phenyl;

R$_8$ is hydrogen, C$_1$–C$_{18}$alkyl or C$_2$–C$_{18}$alkyl which is substituted by at least one hydroxy group;

R$_9$ is C$_1$–C$_{12}$alkylene or a direct bond; or all R$_1$ form together the residue of a polycyclic cycloaliphatic ring system or a polycyclic heterocycloaliphatic ring system with at least one di- or trivalent nitrogen atom;

R$_2$ are independently of each other phenyl or C$_1$–C$_6$alkyl or two together with the linking carbon atom form a C$_5$–C$_6$cycloalkyl group;

A is a divalent group which forms a carbocyclic or heterocyclic 5-, 6- or 7-membered ring which may be further substituted; and R$_3$ is a radical of formula (II)

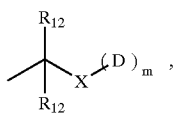

(II)

wherein

X is phenylene, naphthylene or biphenylene, which are unsubstituted or substituted by NO$_2$, halogen, amino, hydroxy, cyano, carboxy, C$_1$–C$_4$alkoxy, C$_1$–C$_4$alkylthio, C$_1$–C$_4$alkylamino or di(C$_1$–C$_4$alkyl)amino;

R$_{12}$ are independently of each other H or CH$_3$;

D is a group

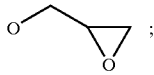

and m is a number from 1 to 4.

2. A composition according to claim 1 in which the polyphenylene ether comprises a plurality of structural units having the formula

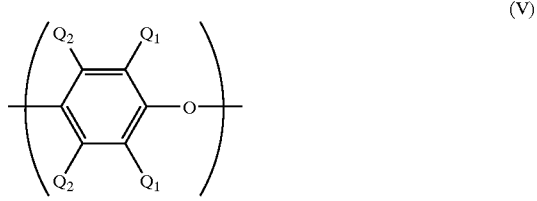

(V)

wherein in each of said units independently, each Q$_1$ is independently halogen, primary or secondary alkyl of 1 to 7 carbon atoms, phenyl, haloalkyl, aminoalkyl, hydrocarbonoxy, or halohydrocarbonoxy wherein at least two carbon atoms separate the halogen and oxygen atoms; and each Q$_2$ is independently hydrogen, halogen, primary or secondary alkyl of 1 to 7 carbon atoms, phenyl, haloalkyl, hydrocarbonoxy or halohydrocarbonoxy as defined for Q$_1$.

3. A composition according to claim 2 in which the polyphenylene ether is a poly(2,6-dimethyl-1,4-phenylene ether).

4. A composition according to claim 1 in which component ii.) is selected from the group consisting of polyamide and polyester.

5. A composition according to claim 4 in which the polyamide is a polyamide-6 or polyamide-6,6.

6. A composition according to claim 4 in which the polyester is selected from the group consisting of polyethylene terephthalate, polybutylene terephthalate, polytrimethylene terephthalate, polycyclohexane-1,4-dimethyleneterephthalate, polyethylene terephthalate/polycyclohexane-1,4-dimethyleneterephthalate copolymer, polyethylene 2,6-naphthalate and polyethylene terephthalate/polyethylene 2,6-naphthalate copolymer.

7. A composition according to claim 1 in which component i.) is a polyphenylene ether and component ii.) is a polyamide.

8. A composition according to claim 1 wherein the glycidyl-functionalized nitroxyl initiator is of the formula (Ib) wherein R$_2$ are independently CH$_3$ or C$_2$H$_5$;

A is —CH$_2$OC(O)—, —OCH$_2$—, C$_2$–C$_3$alkylene, C$_2$–C$_3$alkenylene, or 1,2-phenylene, or said C$_2$–C$_3$alkylene, C$_2$–C$_3$alkenylene and 1,2-phenylene groups substituted by hydroxy, C$_1$–C$_{18}$alkylcarboxy, C$_1$–C$_{18}$alkoxy, benzyloxy, C$_1$–C$_{18}$alkanoyloxy, benzoyloxy, C$_1$–C$_{18}$alkylamino or di(C$_1$–C$_{18}$alkyl)amino; and $R_3$ is a radical of formula (II)

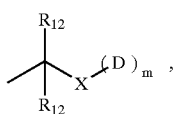
(II)

wherein
X is phenylene, naphthylene or biphenylene;
one $R_{12}$ is H and the other $R_{12}$ is $CH_3$;
D is a group

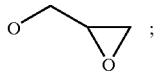

and
m is a number from 1 to 2.

9. A composition according to claim 8 wherein the glycidyl-functionalized nitroxyl initiator is of the formula

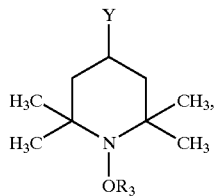
(III)

wherein
Y is H, $OR_{10}$, $NR_{10}R_{11}$ or —O—C(O)—$R_{10}$; and
$R_{10}$ and $R_{11}$ independently are hydrogen or $C_1$–$C_{18}$alkyl.

10. A composition according to claim 9 wherein the glycidyl-functionalized nitroxyl initiator is of the formula (III) wherein $R_3$ is 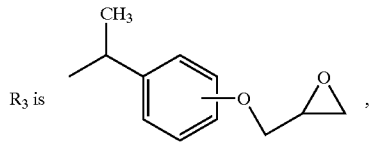, Y is H, $OR_{10}$, $NR_{10}R_{11}$ or —O—C(O)—$R_{10}$; and
$R_{10}$ and $R_{11}$ are independently hydrogen or $C_1$–$C_6$alkyl.

11. A composition according to claim 1 wherein the glycidyl-functionalized nitroxyl initiator is of the formula

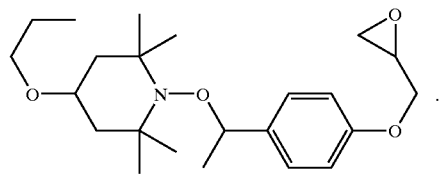.

12. A composition according to claim 1 in which the ethylenically unsaturated monomer is selected from the group consisting of styrene, α-methylstyrene, p-methylstyrene, isoprene and butadiene.

13. A composition according to claim 1 in which the ethylenically unsaturated monomer is styrene.

14. A composition according to claim 1 in which the oligomer, polymer, cooligomer or copolymer prepared by free-radical polymerization of at least one ethylenically unsaturated monomer or oligomer in the presence of a glycidyl-functionalized nitroxyl initiator contains at least one initiator group —$R_3$ and at least one oxyamine group of formula

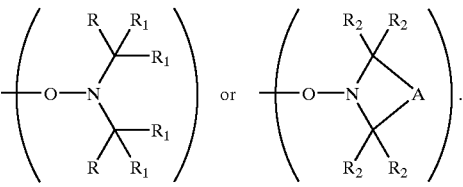.

15. A composition according to claim 1 in which the impact modifier is a triblock copolymer wherein the end-blocks are polystyrene and the mid-block is selected from the group consisting of polyisoprene, polybutadiene, poly (ethylene/butylene) and poly(ethylene/propylene).

16. A composition according to claim 15 in which the mid-block has been hydrogenated.

17. A composition according to claim 15 in which the triblock copolymer is functionalized with maleic anhydride.

18. A method for preparing highly compatible polymer mixtures which comprises blending under intimate blending conditions
   i.) a polymer selected from the group consisting of polyphenylene ether and polystyrene,
   ii.) at least one other polymer containing amine or carboxylic acid end groups,
   iii.) an oligomer, polymer, cooligomer or copolymer prepared by free-radical polymerization of at least one ethylenically unsaturated monomer or oligomer in the presence of a glycidyl-functionalized nitroxyl initiator, and
   iv.) an elastomeric impact modifier,
   wherein the glycidyl-functionalized nitroxyl initiator is of the formula (Ia) or (Ib) according to claim 1.

19. A method according to claim 18 in which the polyphenylene ether comprises a plurality of structural units having the formula

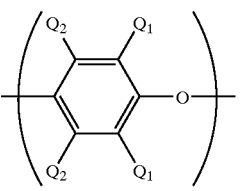
(V)

wherein
in each of said units independently, each $Q_1$ is independently halogen, primary or secondary alkyl of 1 to 7 carbon atoms, phenyl, haloalkyl, aminoalkyl, hydrocarbonoxy, or halohydrocarbonoxy wherein at least two carbon atoms separate the halogen and oxygen atoms; and each $Q_2$ is independently hydrogen, halogen, primary or secondary alkyl of 1 to 7 carbon atoms, phenyl, haloalkyl, hydrocarbonoxy or halohydrocarbonoxy as defined for $Q_1$.

20. A method according to claim 19 in which the polyphenylene ether is a poly(2,6-dimethyl-1,4-phenylene ether).

21. A method according to claim 18 in which component ii.) is selected from the group consisting of polyamide and polyester.

22. A method according to claim 21 in which the polyamide is a polyamide-6 or polyamide-6,6.

23. A method according to claim 21 in which the polyester is selected from the group consisting of polyethylene terephthalate, polybutylene terephthalate, polytrimethylene terephthalate, polycyclohexane-1,4-dimethyleneterephthalate, polyethylene terephthalate/polycyclohexane-1,4-dimethyleneterephthalate copolymer, polyethylene 2,6-naphthalate and polyethylene terephthalate/polyethylene 2,6-naphthalate copolymer.

24. A method according to claim 18 in which component i.) is a polyphenylene ether and component ii.) is a polyamide.

25. A method according to claim 18 wherein the glycidyl-functionalized nitroxyl initiator is of the formula (Ib) wherein $R_2$ are independently $CH_3$ or $C_2H_5$;

A is —$CH_2OC(O)$—, —$OCH_2$—, $C_2$–$C_3$alkylene, $C_2$–$C_3$alkenylene, or 1,2-phenylene, or said $C_2$–$C_3$alkylene, $C_2$–$C_3$alkenylene and 1,2-phenylene groups substituted by hydroxy, $C_1$–$C_{18}$alkylcarboxy, $C_1$–$C_{18}$alkoxy, benzyloxy, $C_1$–$C_{18}$alkanoyloxy, benzoyloxy, $C_1$–$C_{18}$alkylamino or di($C_1$–$C_{18}$alkyl)amino; and $R_3$ is a radical of formula (II)

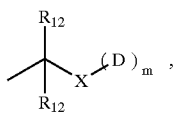

(II)

wherein
X is phenylene, naphthylene or biphenylene;
one $R_{12}$ is H and the other $R_{12}$ is $CH_3$;
D is a group

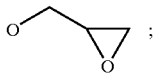

and
m is a number from 1 to 2.

26. A method according to claim 25 wherein the glycidyl-functionalized nitroxyl initiator is of the formula

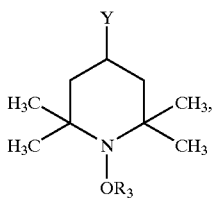

(III)

wherein
Y is H, $OR_{10}$, $NR_{10}R_{11}$ or —O—C(O)—$R_{10}$; and
$R_{10}$ and $R_{11}$ independently are hydrogen or $C_1$–$C_{18}$alkyl.

27. A method according to claim 26 wherein the glycidyl-functionalized nitroxyl initiator is of the formula (III) wherein $R_3$ is

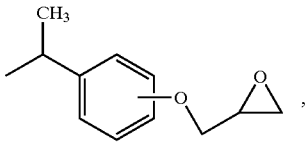

Y is H, $OR_{10}$, $NR_{10}R_{11}$ or —O—C(O)—$R_{10}$; and
$R_{10}$ and $R_{11}$ are independently hydrogen or $C_1$–$C_6$alkyl.

28. A method according to claim 27 wherein the glycidyl-functionalized nitroxyl initiator is of the formula

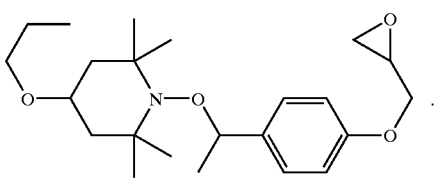

29. A method according to claim 18 in which the ethylenically unsaturated monomer is selected from the group consisting of styrene, α-methylstyrene, p-methylstyrene, isoprene and butadiene.

30. A method according to claim 18 in which the ethylenically unsaturated monomer is styrene.

31. A method according to claim 18 in which the oligomer, polymer, cooligomer or copolymer prepared by free-radical polymerization of at least one ethylenically unsaturated monomer or oligomer in the presence of a glycidyl-functionalized nitroxyl initiator contains at least one initiator group —$R_3$ and at least one oxyamine group of formula

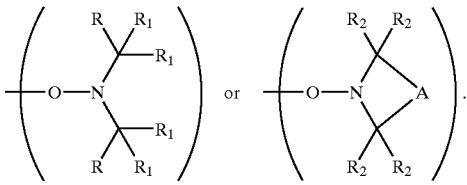

32. A method according to claim 18 in which the impact modifier is a triblock copolymer wherein the end-blocks are polystyrene and the mid-block is selected from the group consisting of polyisoprene, polybutadiene, poly(ethylene/butylene) and poly(ethylenelpropylene).

33. A method according to claim 32 in which the mid-block has been hydrogenated.

34. A method according to claim 32 in which the triblock copolymer is functionalized with maleic anhydride.

* * * * *